(12) United States Patent
Wang et al.

(10) Patent No.: US 6,400,484 B1
(45) Date of Patent: Jun. 4, 2002

(54) SCANNER FOR SCANNING TRANSPARENT AND REFLECTIVE DOCUMENTS

(75) Inventors: Ping-Chih Wang, Hsinchu; Lin-Ta Tseng, Hsin-Chu Hsien, both of (TW)

(73) Assignee: Mustek Systems Inc., Hsin-Chu (TW)

( * ) Notice: Subject to any disclaimer, the term of this patent is extended or adjusted under 35 U.S.C. 154(b) by 39 days.

(21) Appl. No.: 09/693,947

(22) Filed: Oct. 23, 2000

(51) Int. Cl.$^7$ ............................................... G02B 26/08
(52) U.S. Cl. ......................... 359/196; 358/474; 358/475
(58) Field of Search ................................ 359/196, 201, 359/204, 209–212; 358/474, 475, 483, 494, 496, 497

(56) References Cited

U.S. PATENT DOCUMENTS 5,606,450 A * 2/1997 Chen ........................... 359/223
6,185,011 B1 * 2/2001 William ........................ 358/474

* cited by examiner

*Primary Examiner*—James Phan
(74) *Attorney, Agent, or Firm*—Winston Hsu

(57) ABSTRACT

A scanner has a casing with a transparent platform, a scanning module movably installed inside the casing, a reflecting surface module located above the transparent platform, a driving device installed inside the casing to move the scanning module, and a control circuit installed inside the casing to control operations of the scanner. The scanning module has a housing, a first light source and a second light source installed in parallel inside the housing, the first light source or the second light source illuminating the document, an image sensing module installed inside the housing to scan images from the document to produce corresponding scanning signals, and a reflector module installed inside the housing to reflect the images from the document to the image sensing module. The reflecting surface module is removably fixed to the housing and located above the transparent platform to reflect light upwardly emitted from the first light source down to the document. When scanning transparent documents, the first light source is turned on and the second light source is turned off. When scanning reflective documents, the second light source is turned on and the first light source is turned off.

8 Claims, 5 Drawing Sheets

SCANNER FOR SCANNING TRANSPARENT AND REFLECTIVE DOCUMENTS

BACKGROUND OF THE INVENTION

1. Field of the Invention

The present invention provides a scanner and, in particular, discloses a scanner having a movable reflecting surface module for scanning transparent and reflective documents.

2. Description of the Prior Art

Please refer to FIG. 1 through FIG. 3. FIG. 1 is a perspective view of a conventional scanner 10. FIG. 2 is a functional block diagram of the scanner 10. FIG. 3 is a cross-sectional view of the scanner 10 line 3—3. The scanner 10 comprises a casing 12 with a transparent platform 14 onto which is placed a document 13 to be scanned, a scanning module 16, a driving device 18 installed inside the casing 12 for moving the scanning module 16, a control circuit 20 installed inside the casing 12 for controlling the operations of the scanner 10, and a reflecting surface module 26 installed over the transparent platform 14.

The scanning module 16 is movably installed inside the casing 12 and comprises a light source 22 for illuminating the document 13 on the transparent platform 14, an image sensing module 24 to scan images from the document 13 and produce corresponding scanning signals, and a reflector module 28 installed inside the casing 12 to reflect light from the document 13 to the image sensing module 24. The reflecting surface module 26 includes a first reflector 23 and a second reflector 25, both being installed on either side of the reflecting surface module 26. The first reflector 23 reflects light upwardly emitted from the light source 22 horizontally to the second reflector 25, which then reflects the light downward to the transparent platform 14.

When a user wishes to scan a reflective document, the user must remove the reflecting surface module 26 and put on an upper cover (not shown), which has the same size as the transparent platform 14. The light then coming up from the light source 22 will illuminate the document 13 and be reflected down. Through the reflector module 28, the light is then reflected to the image sensing module 24 to produce corresponding image signals.

When the user wishes to scan a transparent document 13, the user must install the reflecting surface module 26 onto the transparent platform 14 so that light coming up from the light source 22 will pass down through the document 13 via the first reflector 23 and the second reflector 25. Then reflected by the reflector module 28, the light is sent to the image sensing module 24 to produce corresponding image signals.

When scanning a transparent document, the reflecting surface module 26 is fixed onto the transparent platform 14. The scanning area cannot be larger than the reflecting surface module 26, which is also limited by the sizes of the first reflector 23 and the second reflector 25. Larger first and second reflectors 23 and 25 permit a larger area to be scanned on the transparent platform 14.

To increase the scanning area of transparent documents for the scanner 10, the area and height of the reflecting surface module 26 must be increased correspondingly. As the area of the reflecting surface module 26 gets larger, the document area covered by the reflecting surface module 26 can also be increased. With increasing heights of the reflecting surface module 26, the area for installing the first reflector 23 and the second reflector 26 becomes larger. In this manner, the scanning area for transparent documents is increased. In any case, the efficiency of use of the area of the reflecting surface module 26 is always below 50%. Accordingly, the conventional method to increase the scanning area for transparent documents in the scanner 10 results in increasing manufacturing costs. Such a scanner also becomes inconvenient due to the large volume of the reflecting surface module 26.

Furthermore, as shown in FIG. 3, since the document 13 and the transparent platform 14 are not totally transparent, when scanning a transparent document light emitted from the left side of the light source 22 will be partially reflected downward and detected by the image sensing module 24. The image signal noise is thus increased, lowering the quality of the scan.

SUMMARY OF THE INVENTION

It is therefore a primary objective of the present invention to provide a scanner with a reflecting surface module movably installed. An a transparent platform to solve the aforementioned problems in the prior art.

Briefly, the present invention discloses a scanner with a casing having a transparent platform onto which is placed a document to be scanned, a scanning module movably installed inside the casing, a reflecting surface module located above the transparent platform, a driving device installed inside the casing to move the scanning module, and a control circuit installed inside the casing to control operations of the scanner.

The scanning module has a housing moveably installed inside the casing, a first light source and a second light source installed in parallel inside the housing, the first light source and the second light source illuminating the document on the transparent platform, an image sensing module installed inside the housing to scan images from the document on the transparent platform to produce corresponding scanning signals, and a reflector module installed inside the housing to reflect the images from the document on the transparent platform to the image sensing module. The reflecting surface module is removably fixed to the housing and located above the transparent platform to reflect light upwardly emitted from the first light source down to the document, the reflecting surface module being driven when the housing of the scanning module is moved. If the document is predominantly transparent, the control circuit will turn on the first light source and turn off the second light source, and light upwardly emitted from the first light source is reflected downward by the reflecting surface module and passes through the transparent document to the image sensing module to produce the corresponding scanning signals. If the document is predominantly reflective, then the control circuit will turn on the second light source and turn off the first light source, and light emitted from the second light source is reflected downward from the document and reflected to the image sensing module by the reflector module to produce the corresponding scanning signals.

It is an advantage of the present invention that by having the reflecting surface module removable fixed above the transparent platform to the housing of the scanning module, the size of scanning area can cover the entire transparent platform for transparent documents and reflective documents alike. Furthermore, the size of the reflecting surface module is reduced, and the overall scanning quality is decreased.

These and other objectives of the present invention will no doubt become obvious to those of ordinary skill in the art after reading the following detailed description of the preferred embodiment, which is illustrated in the various figures and drawings.

DETAILED DESCRIPTION OF THE INVENTION

Figure 1:
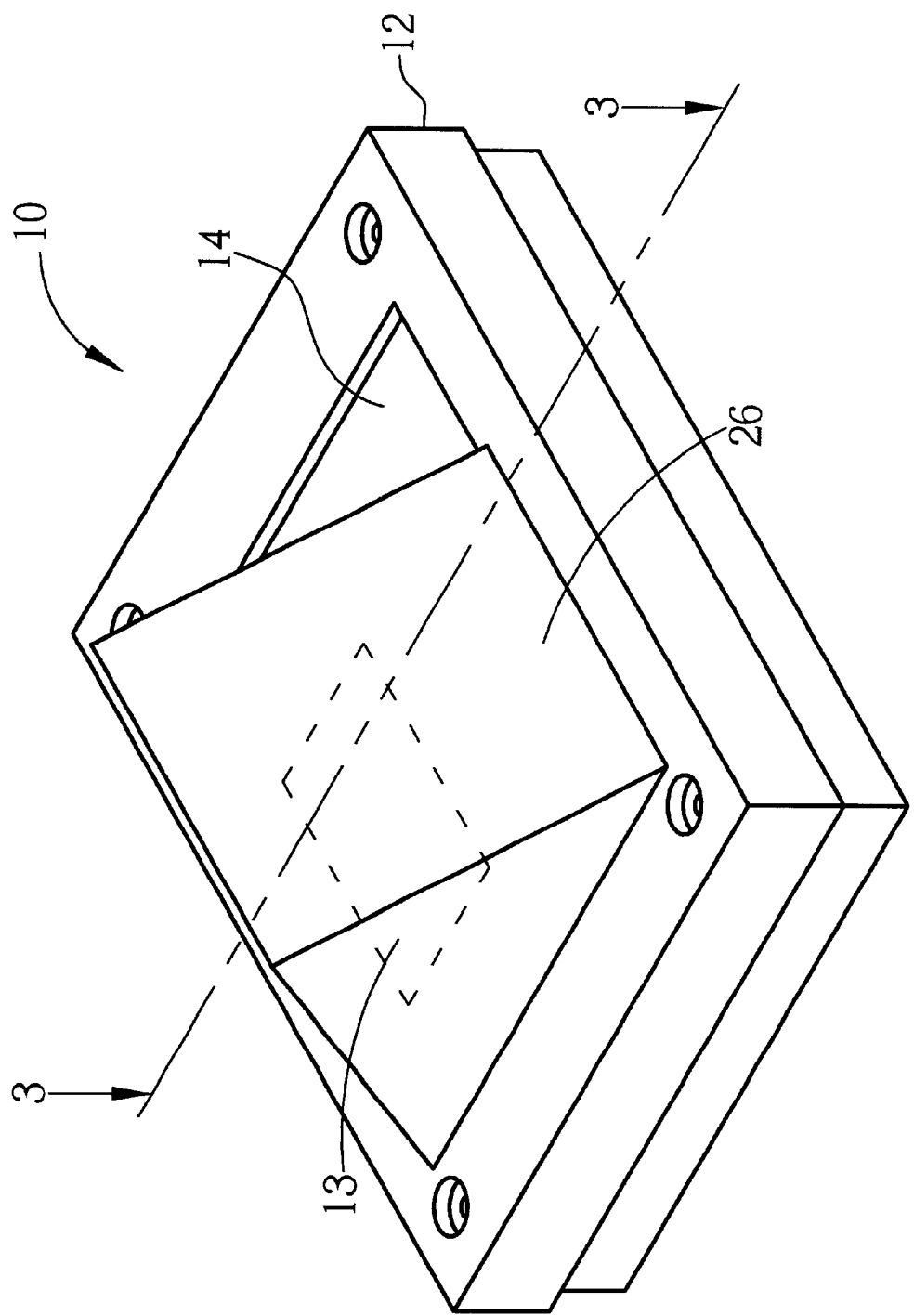
FIG. 1 is a perspective view of a scanner according to the prior art.
Figure 2:
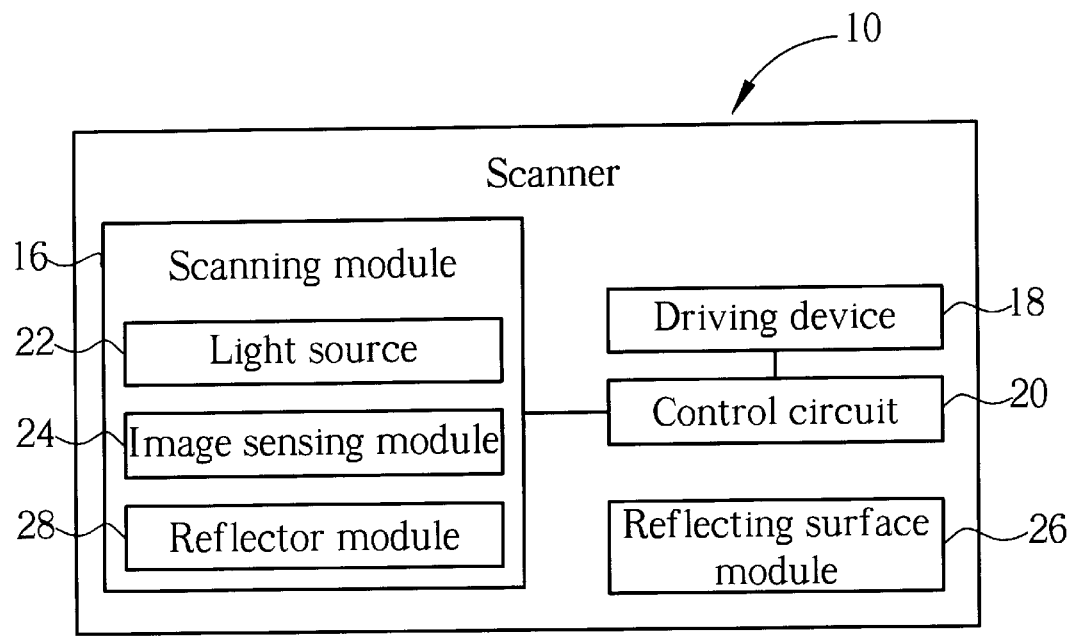
FIG. 2 is a functional block diagram of the scanner in FIG. 1.
Figure 3:
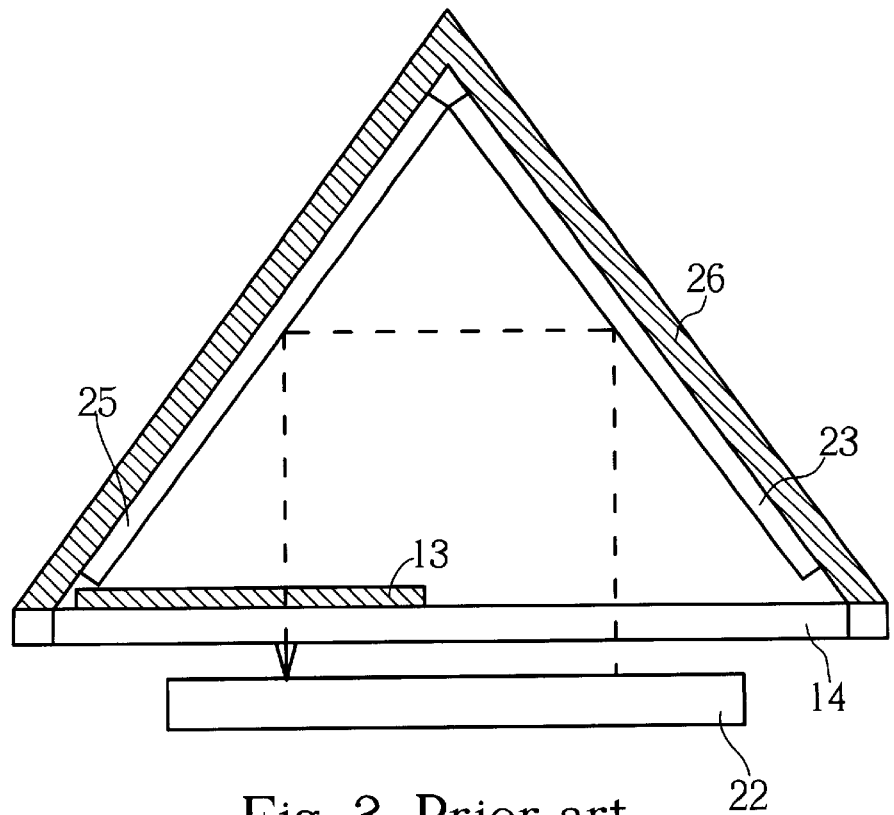
FIG. 3 is a cross-sectional view of the scanner in FIG. 1.
Figure 4:
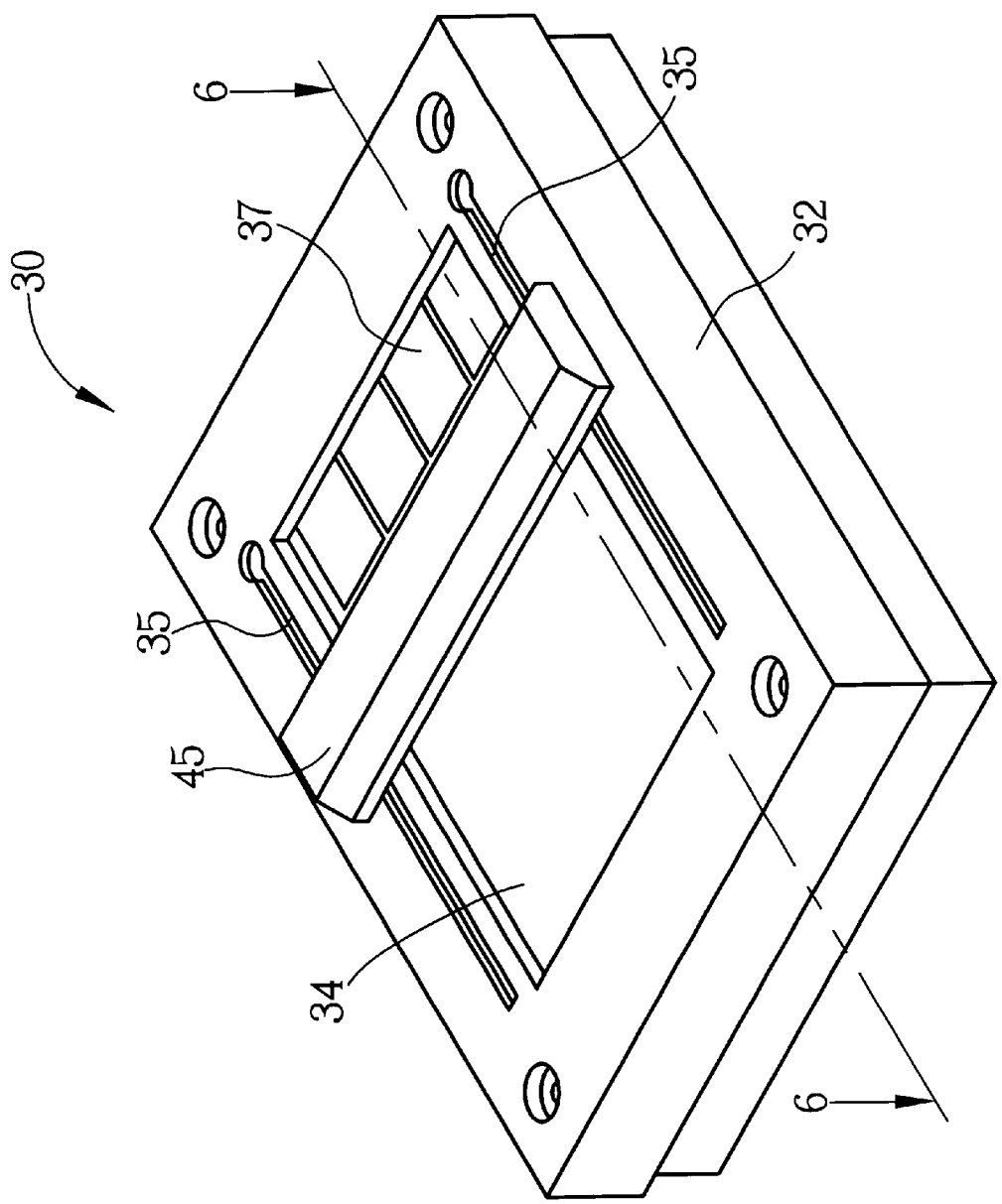
FIG. 4 is a perspective view of a scanner according to the present invention.
Figure 5:
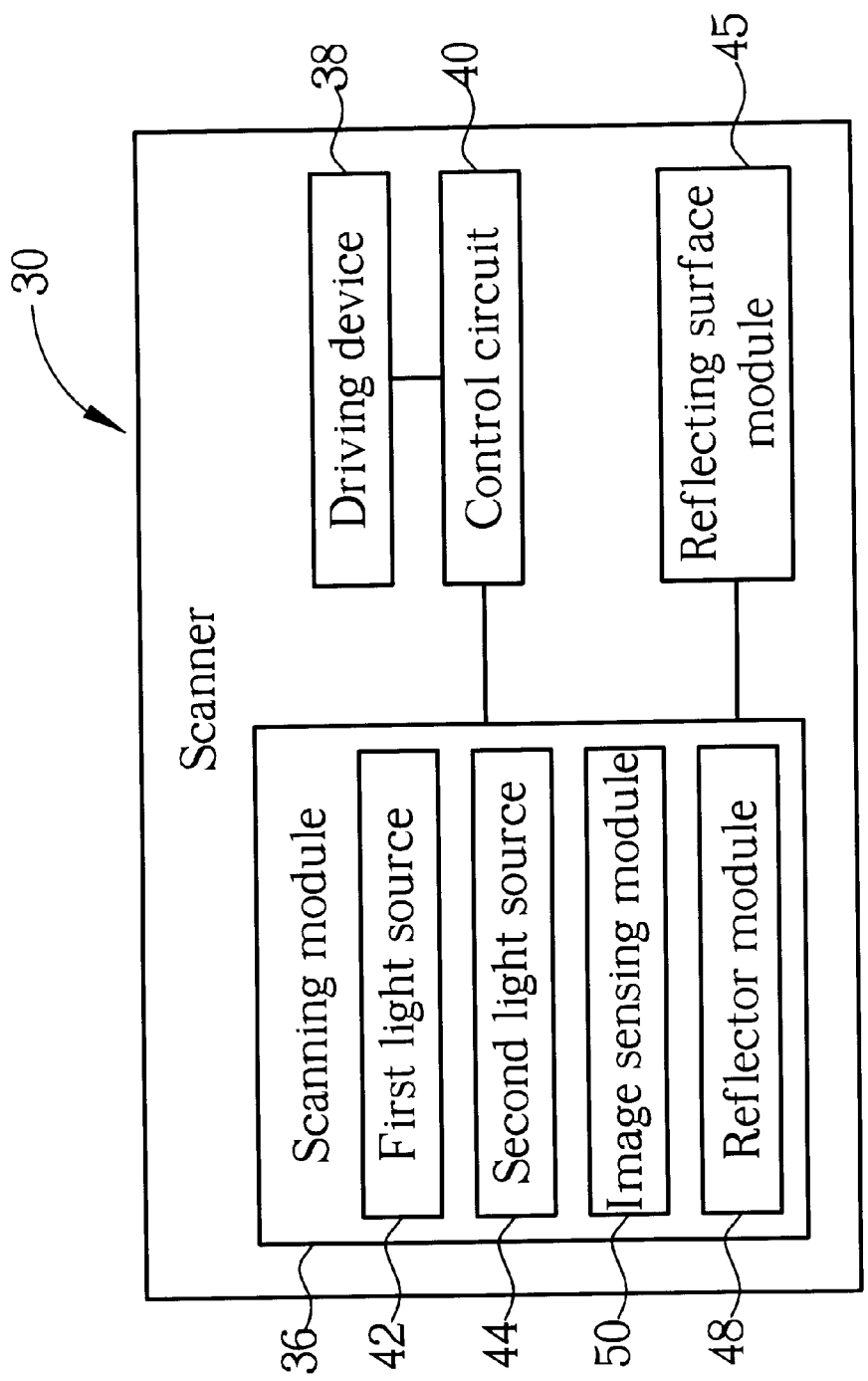
FIG. 5 is a functional block diagram of the scanner in FIG. 4.

Please refer to FIG. 4 and FIG. 5. FIG. 4 is a perspective view of a scanner 30 of the present invention. FIG. 5 is a functional block diagram of the scanner 30. The scanner 30 comprises a casing 32 with a transparent platform 34 onto which is placed a document to be scanned, a scanning module 36, a driving device 38 installed inside the casing 32 to move the scanning module 36, a control circuit 40 installed inside the casing 32 to control operations of the scanner 30, and a reflecting surface module 45 removably installed on the scanning module 36 and above the transparent platform 34.

The scanning module 36 comprises a housing 41 (shown in FIG. 6) moveably installed inside the casing 32, a first light source 42 and a second light source 44 installed in parallel inside the housing 41, the first light source and the second light source illuminating the document on the transparent platform 34, an image sensing module 50 installed inside the housing 41 to scan images from the document and produce corresponding scanning signals, and a reflector module 48 installed inside the housing 41 to reflect the images from the document to the image sensing module 50. The reflecting surface module 45 is removably fixed to the housing 41 of the scanning module 36, and reflects light upwardly emitted from the first light source 42 down to the document on the transparent platform 34. The reflecting surface module 45 is driven when the housing 41 of the scanning module 36 is moved.

The casing 32 of the scanner 30 comprises two parallel strip openings 35 located on two opposite sides of the transparent platform 34, and a bottom side of the reflecting surface module 45 comprises two supporting poles to fix the reflecting surface module 45 to the housing 41 of the scanning module 36 through the two parallel strip openings 35.

There are three methods to set the scanner 30 to scan transparent and reflective documents. The first method is to install an option switch (not shown) on the scanner 30 that connects to the control circuit 40 indicating whether the document to be scanned is transparent or reflective. The second method is to use software installed on a computer to indicate the control circuit 40 whether the document to be scanned is transparent or reflective. The third method is to install a sensor (not shown) on the scanner 30 that can detect whether the reflecting surface module 45 is mounted on the scanning module 36. The control circuit 40 then determines whether the first light source 42 is used to illuminate the document 37 according to the output of the sensor. When the reflecting surface module 45 is mounted over the transparent platform 34, the reflecting surface module 45 moves synchronously back and forth with the scanning module 36 through the parallel openings 35.

Figure 6:
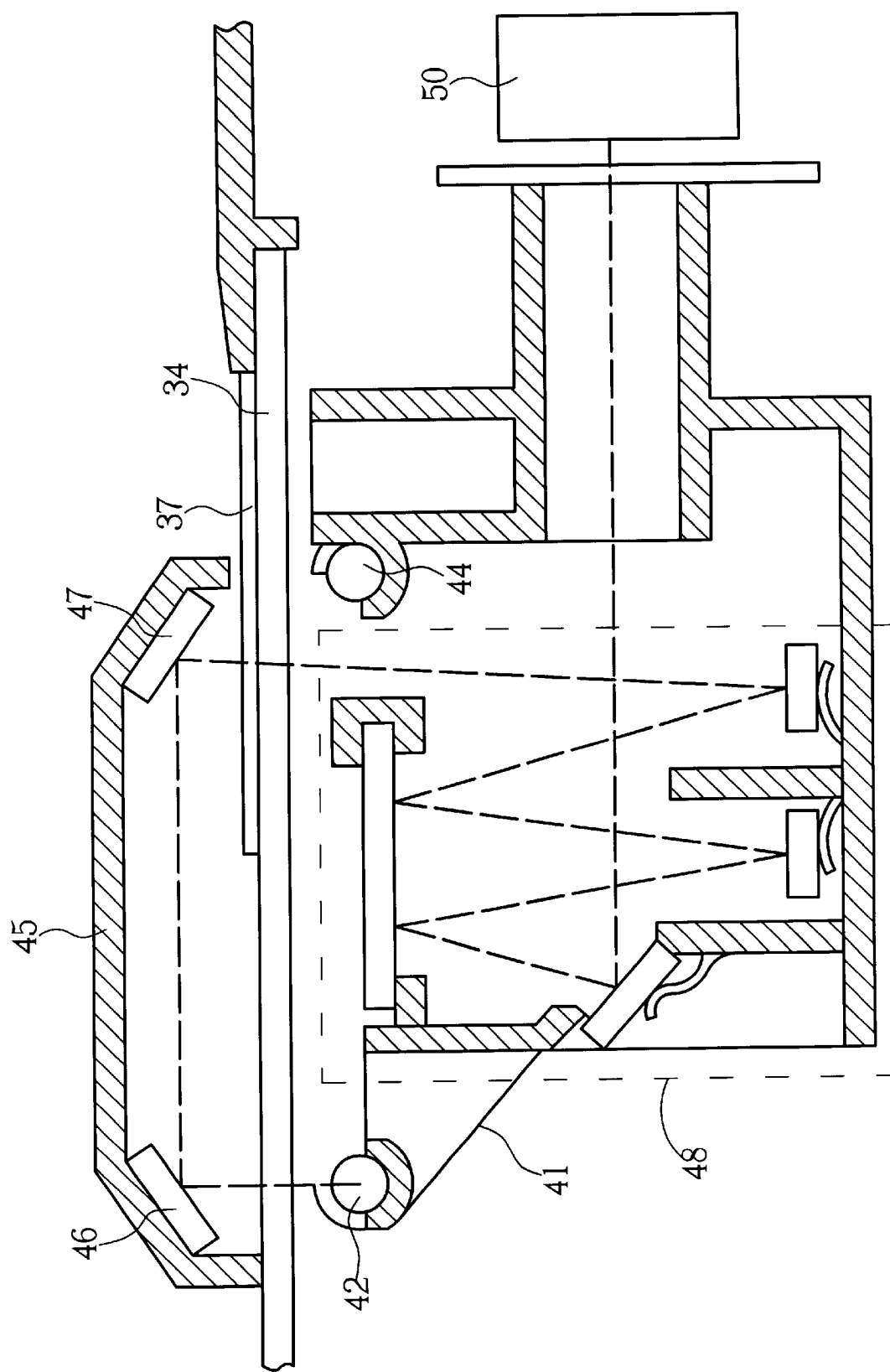
FIG. 6 is a cross-sectional view of the scanner in FIG. 4.

Please refer to FIG. 6, which is a cross-sectional view of the scanner 30 along line 6—6. The reflecting surface module 45 comprises a first reflector 46 above the first light source 42 and a second reflector 47, the first and second reflectors 46, 47 being installed on two sides of the reflecting surface module 45. Light coming up from the first light source 42 is reflected by the first reflector 46 to the second reflector 47, and is then reflected downward to a document 37 on the transparent platform 34 by the second reflector 47.

When the document 37 on the transparent platform 34 is transparent, the user can choose to manually set the option switch, make selection using the software, or let the sensor detect and notify the control circuit 40. The control circuit 40 then turns on the first light source 42 and turns off the second light source 44. Light upwardly emitted from the first light source 42 is reflected by the first reflector 46 to the second reflector 47, and is then reflected downward to the document 37 on the transparent platform 34 by the second reflector 47. The light is further reflected to the image sensing module 50 by the reflector module 48 to produce corresponding image signals.

When the document 37 is a reflective document, there are three methods to operate the scanner 30. The first method is to take off the reflecting surface module 45, triggering the sensor. The second method is to manually set the option switch without pulling off the reflecting surface module 45. The third method is to make selection using software. The control circuit 40 then turns on the second light source 44 and turns off the first light source 42. Light emitted from the second light source 44 toward the document 37 will be reflected down to the reflector module 48 and then to the image sensing module 50 to produce corresponding image signals. If the user chooses to take off the reflecting surface module 45, an upper cover with the same size as the transparent platform should be mounted over the transparent platform 34.

In contrast to the conventional scanner 10, the scanning module 36 and the reflecting surface module 45 of the scanner 30 of the present invention are detachably fixed to each other. The reflecting surface module 45 moves over the transparent platform 34, connected to the scanning module 36 through the parallel openings 35. Consequently, for transparent documents, the scanning area of the scanner 30 is equal to that of the transparent platform 34. Additionally, since the reflecting surface module 45 does not need to cover the area of the entire transparent document, the scanning area is not limited by the areas of the first reflector 46 and the second reflector 47, thus effectively decreasing the volume of the reflecting surface module 45.

The scanning module 36 of the scanner 30 comprises the first and second light sources 42, 44 for scanning transparent and reflective documents, respectively. Moreover, when the document to be scanned is a reflective one, the user can choose not to take off the reflecting surface module 45 and add an additional upper cover, which simplifies operational procedures.

In contrast to the reflecting surface module 26 of the conventional scanner 10, the reflecting surface module 45 of the scanner 30 has a smaller volume and a lower height, reducing the manufacturing cost of the scanner 30. Furthermore, it is more convenient to operate because of the smaller volume of the reflecting surface module 45.

Although the volume of the reflecting surface module 45 is smaller, the scanning area of the transparent document in the scanner 30 is not affected because the reflecting surface module 45 is movably installed on the transparent platform 34, and tracks the scanning module 36. In addition, since the first and second reflectors 46, 47 of the invention are not installed on both sides of the upper portion of the light source 22 as the conventional first and second reflectors 23, 25 are, signal noise problems associated with reflecting unwanted light downward is reduced. The quality of a scanned image of the present invention is thus enhanced.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A scanner comprising:
   a casing with a transparent platform onto which is placed a document to be scanned;
   a scanning module comprising:
      a housing moveably installed inside the casing;
      a first light source and a second light source installed in parallel inside the housing, the first light source or the second light source illuminating the document on the transparent platform;
      an image sensing module installed inside the housing to scan images from the document on the transparent platform to produce corresponding scanning signals; and
      a reflector module installed inside the housing to reflect the images from the document on the transparent platform to the image sensing module;
   a reflecting surface module movably fixed to the housing and located above the transparent platform to reflect light upwardly emitted from the first light source down to the document on the transparent platform, the reflecting module being driven when the housing of the scanning module is moved;
   a driving device installed inside the casing to move the scanning module; and
   a control circuit installed inside the casing to control operations of the scanner;
   wherein if the document is predominantly transparent, the control circuit will turn on the first light source and turn off the second light source, and light upwardly emitted from the first light source is reflected downward by the reflecting surface module and passes through the transparent document to the image sensing module to produce the corresponding scanning signals; however, if the document is predominantly reflective, then the control circuit will turn on the second light source and turn off the first light source, and light emitted from the second light source is reflected downward from the document and reflected to the image sensing module by the reflector module to produce the corresponding scanning signals.

2. The scanner of claim 1 wherein the casing of the scanner comprises two parallel strip openings located on two sides of the transparent platform, and a bottom side of the reflecting surface module comprises two supporting poles to fix the reflecting surface module to the housing of the scanning module through the two parallel strip openings.

3. The scanner of claim 1 wherein the reflecting surface module comprises a first reflector above the first light source and a second reflector; wherein light upwardly emitted from the first light source is reflected by the first reflector to the second reflector, and is then reflected downward to the document on the transparent platform by the second reflector.

4. The scanner of claim 1 wherein the scanner further comprises an option switch electrically connected to the control circuit, the option switch being used to decide whether the document is predominantly transparent or predominantly reflective.

5. The scanner of claim 1 wherein the reflecting surface module is removeably fixed to the scanning module.

6. The scanner of claim 5 further comprising a sensor to sense if the reflecting surface module is fixed to the scanning module.

7. The scanner of claim 6 wherein the control circuit determines if the first light source is to be used to illuminate the document according to the output of the sensor.

8. The scanner of claim 1 wherein the scanner is connected to a computer which uses software to indicate the control circuit whether the document to be scanned is predominantly transparent or reflective.

* * * * *